United States Patent [19]
Morin

[11] 3,747,369
[45] July 24, 1973

[54] EXTENSIBLE UNIVERSAL JOINT
[75] Inventor: Gérard Morin, Bondy, France
[73] Assignee: Societe Anonyme D.B.A.
[22] Filed: Feb. 3, 1972
[21] Appl. No.: 223,275

[30] Foreign Application Priority Data
Feb. 11, 1971 France .............................. 7104604

[52] U.S. Cl. .......................................... 64/21, 64/8
[51] Int. Cl. ............................................... F16d 3/30
[58] Field of Search ........................... 64/21, 8, 9 A

[56] References Cited
UNITED STATES PATENTS
2,361,135  10/1944  Sturges .................................. 64/21
3,166,919  1/1965  Kayser .................................. 64/21

Primary Examiner—Charles J. Myhre
Assistant Examiner—Randall Heald
Attorney—Ken C. Decker

[57] ABSTRACT

An extensible universal joint of the type comprising two interlaced heads each having arms, and a plurality of balls each located between each pair of adjacent arms, the balls being guided in races which are formed in confronting surfaces of the arms and extend to the end of the arms. A clip secured at the end of each arm comprises portions protruding on the surface of the races formed in this arm to prevent accidental dislocation of the joint.

2 Claims, 2 Drawing Figures

EXTENSIBLE UNIVERSAL JOINT

This invention relates to extensible universal joints.

More particularly, the invention is directed to avoiding accidental dislocation of an extensible universal joint of the type comprising two interlaced heads each having arms, and a plurality of balls each located between each pair of adjacent arms. The balls are guided in races which are formed in confronting surfaces of the arms and extend to the end of these arms. As the heads of the joint are allowed to bend and to move axially with respect to each other, the balls and the heads can readily come apart.

It is known to provide these extensible universal joints with straps ensuring that dislocation of the joint will not result from the variations in length the joint experiences either during various handling operations or during its mounting on a machine or, on a vehicle. Thus, the straps commonly used are merely handling and mounting accessories generally constituted by metallic wires or by bands tying up the two heads of the joint. These straps are generally placed over a resilient boot which normally protects the fully assembled joint. The straps are permanently removed when the joint is secured on the machine or on the vehicle which utilizes it. It may even be necessary to remove the straps while the joint is being mounted insofar the straps hinder the mounting operation.

It will be understood that the fitting as well as the removal of the strap is a delicate operation, since any awkward move may cause the members of the joint to come apart. The same risk exists when the joint is free of straps, during the manufacture as well as , in the course of reparations performed on the machine or on the vehicle utilizing the joint. It is to be noted that, once its constitutive members have come apart, a joint can be repaired only by the manufacturer.

The object of the invention, is an extensible universal joint of the type referred to above in which members protruding on the surface of the races are secured in the end region of the arms.

In a preferred embodiment, these members are clips fitted at the end of the arms, a portion of the clips engaging the surface of the races.

The invention will now be described by way of example with reference to the accompanying drawings in which.

Figure 1:
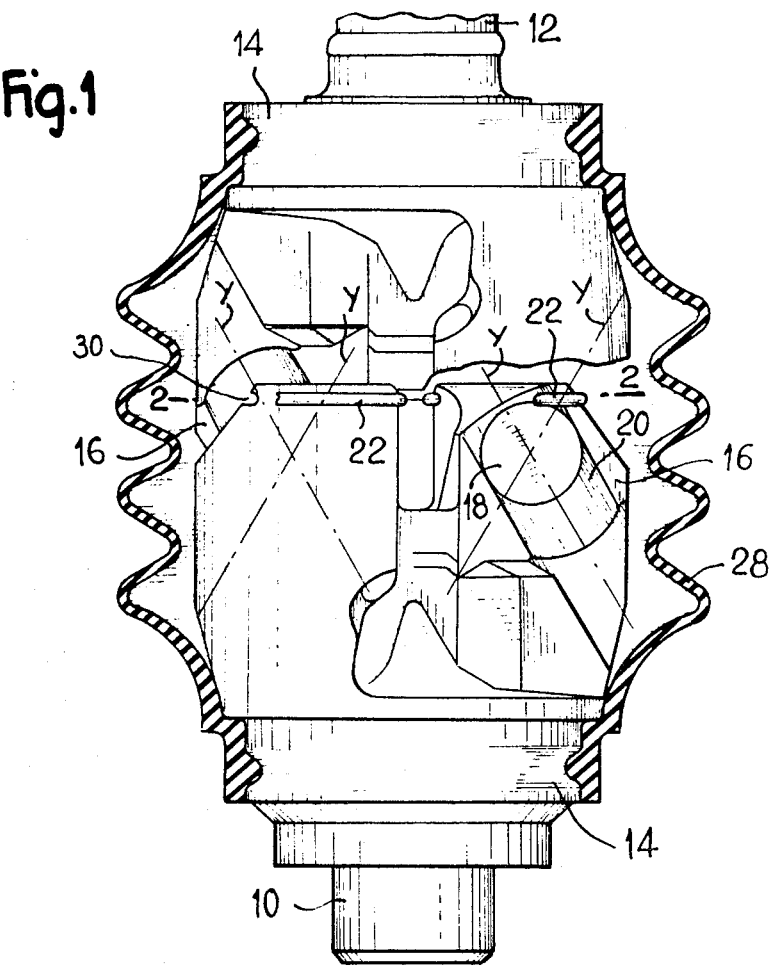
FIG. 1 is an elevational view with portions cut away of an extensible universal joint according to the invention.
Figure 2:
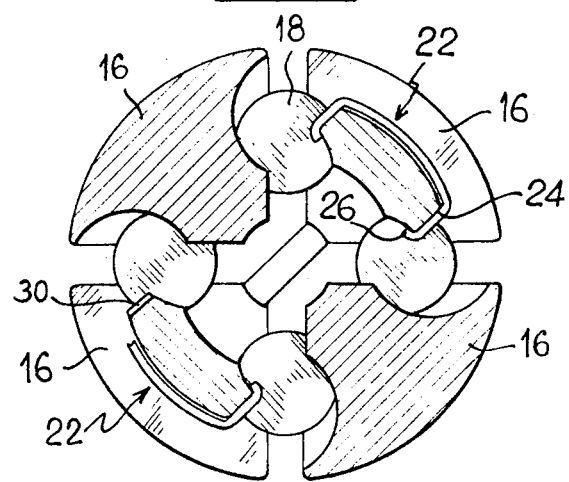
FIG. 2 is a cross-sectional view along line 2—2 of FIG.1.

The universal joint shown in the Figures comprises a driving shaft 10 and a driven shaft 12, each connected to a head 14 having two arms 16. The two heads 14 are substantially identical. Their arms 16 are interlaced and a ball 18 is placed between each pair of interlaced arms. The balls 18 are guided in part-circular grooves 20 formed in confronting surfaces of the arms. The various grooves, particularly those not fully visible in FIG. 1, are defined by their axes Y. It can be seen that the grooves 20 are inclined with respect to the axis of the heads 14 in such a manner that the centers of balls 18 will remain in a same plane as the balls move along the grooves 20 either because the joint is bent or because the heads 14 are more deeply inserted into on another.

In these conditions, a rotational effort applied to one of the shafts 10, 12 is integrally transmitted to the other shaft through the balls 18, irrespective of the bending angle of the joint.

It has been noted that the heads 14 are axially movable with respect to one another. This allows the joint to conform to variations liable to occur in the length of the transmission system utilizing the joint, for example the transmission between the differential and an independently suspended wheel of a vehicle. As shown in FIG. 1, the joint has reached the greatest admissible extension, and any increase in length should result in the dislocation of the joint, since the balls 18 would come out of the groove 20. If the joint is operatively included in a transmission system, the extension capacity of the joint will be chosen greater than the variations encountered in the transmission system, and consequently, it will not be possible that the joint dislocates. However, a risk of dislocation can exist when the joint is not permanently secured, that is during the assembly, the handling and the mounting of the joint, as well as in the course of reparations performed on the transmission system.

To eliminate any risk of dislocation, the joint of the invention includes a means constituted by clips 22 received in shallow grooves 30 formed in the end portions of arms 16. Each clip 22 is a U-shaped steel wire having a bridge portion engaged with the outer surface of the arm 16 and two leg portions respectively engaged with the two surfaces of the arm in which the grooves 20 are formed. The ends 26 of the clip 22 are bent over the surface of these portions. The clips 22 are sufficiently resilient for allowing them to be placed without using a particular tool.

It will be appreciated that the joint cannot dislocate due to the fact that, when the extension of the joint is such that the balls 18 are in abutment with the protuberances formed on the surface of the grooves 20 by the ends 26 of the clips 22, the clips oppose a resisting force which precludes any further extension of the joint.

In general, the joint is surrounded with a resilient boot 28 which prevents the ingress of foreign matter and defines an enclosure capable of being filled up with a lubricant. In the past, steps for preventing the dislocation of the joint necessitated that straps whould be placed over the boot to tie up the two shafts or the two heads of the joint. These straps could not possibly remain on the joint after it had been mounted on a machine or on a vehicle, and they often hindered the mounting of the joint. Hence, the use of the straps was practically limited to the handling of the joint. By contrast with the prior art, the clips 22 prohibit the dislocation of the joint of the invention from the moment the joint is assembled, and at any moment thereafter, particularly while the boot is being fitted, during the handling and mounting of the joint, and in the course of subsequent dismounting. The clips 22 can be manufactured at low cost, their dimensions are negligible and they do not impede the operation of the joint.

I claim:

1. An extensible universal joint comprising two interlaced heads, each head having substantially axially extending arms, and force transmitting elements located between each pair of adjacent arms, conforming surfaces of said adjacent arms having substantially rectilinear races for guiding said balls, said races extending to the end of the arms, and a clip carried by one of said arms and extending into said races to engage said force transmitting elements to prevent the latter from falling from said races, said clip being generally U-shaped to present a bridge portion and a pair of legs extending from said bridge portion, said bridge portion engaging the outer surface of said one arm to permit the legs to extend through said one arm into said races.

2. The invention of claim 1:
said one arm having a groove formed in one end of the latter, said bridge portion being received by said groove.

* * * * *